US008468775B2

(12) United States Patent
Vaughn (10) Patent No.: US 8,468,775 B2
(45) Date of Patent: *Jun. 25, 2013

(54) MOMENT RESISTANT BUILDING COLUMN INSERT SYSTEM AND METHOD

(76) Inventor: Willaim B. Vaughn, Lafayette, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 11/801,815

(22) Filed: May 10, 2007

(65) Prior Publication Data

US 2007/0261356 A1 Nov. 15, 2007

Related U.S. Application Data

(63) Continuation-in-part of application No. 11/373,719, filed on Mar. 10, 2006, now Pat. No. 7,637,076.

(51) Int. Cl.
| | |
|---|---|
| E04C 3/00 | (2006.01) |
| E04C 5/00 | (2006.01) |
| E04B 1/38 | (2006.01) |
| E04B 1/00 | (2006.01) |
| F16L 41/00 | (2006.01) |
| F16B 9/00 | (2006.01) |

(52) U.S. Cl.
USPC ............... 52/843; 52/834; 52/838; 52/702; 52/252; 52/272; 403/200

(58) Field of Classification Search
USPC .......... 52/831, 835, 838, 649.3, 655.1, 656.9, 52/252, 253, 272, 167.1, 702, 289, 834, 843, 52/269; 403/200, 201, 217–219, 169–178
See application file for complete search history.

(56) References Cited

U.S. PATENT DOCUMENTS

| | | | | | |
|---|---|---|---|---|---|
| 3,319,691 | A | * | 5/1967 | Fisher | 411/96 |
| 3,593,477 | A | * | 7/1971 | Briggs | 52/253 |
| 4,235,559 | A | * | 11/1980 | Rooklyn | 403/262 |
| 4,368,998 | A | | 1/1983 | Pestoor | |
| 5,012,622 | A | | 5/1991 | Sato et al. | |
| 5,028,093 | A | * | 7/1991 | Nason | 301/37.374 |
| 5,259,160 | A | * | 11/1993 | Carannante | 52/252 |
| 5,289,665 | A | * | 3/1994 | Higgins | 52/655.1 |
| 5,410,847 | A | * | 5/1995 | Okawa et al. | 52/272 |
| 5,412,913 | A | * | 5/1995 | Daniels et al. | 52/79.13 |
| 5,595,040 | A | | 1/1997 | Chen | |
| 5,680,737 | A | * | 10/1997 | Sheipline | 52/655.1 |
| 5,901,525 | A | * | 5/1999 | Doeringer et al. | 52/835 |
| 6,032,431 | A | * | 3/2000 | Sugiyama | 52/656.9 |
| 6,135,691 | A | * | 10/2000 | Nadarajah et al. | 411/431 |
| 6,138,427 | A | * | 10/2000 | Houghton | 52/655.1 |
| 6,219,989 | B1 | * | 4/2001 | Tumura | 52/838 |
| 6,293,063 | B2 | | 9/2001 | Van Doren | |

(Continued)

*Primary Examiner* — Andrew Triggs (57) ABSTRACT

A moment resistant building column insert system is provided that enables the erection of beams to columns, and the installation and pretension of connection bolts possible in a single stop to each beam-column joint in the field. Included is a building column insert with pre-hardened structural filler inside, and a pattern of through-holes transverse to the insert length, where the insert has threaded elements disposed inside and concentric to erection holes in the pattern. The insert is disposed inside a building column. Erection bolts installed to the erection holes to hold the beam in place against the column with the holes in the beam mounting plate, the column and insert aligned. Connection through-bolts are installed and pretensioned to provide the connection strength needed to make a beam-column moment joint rigid. Without the pre-hardened structural filler in the insert the column would deform or crush due to the bolt pretensioning.

21 Claims, 8 Drawing Sheets

U.S. PATENT DOCUMENTS

| | | | | |
|---|---|---|---|---|
| 6,390,719 B1 * | 5/2002 | Chan | | 403/205 |
| 6,494,658 B1 * | 12/2002 | Roy | | 411/428 |
| 6,516,583 B1 * | 2/2003 | Houghton | | 52/655.1 |
| 6,532,713 B2 | 3/2003 | Katayama et al. | | |
| 6,679,023 B2 | 1/2004 | Rizzotto | | |
| 6,694,700 B1 * | 2/2004 | Mackett | | 52/764 |
| 6,739,099 B2 * | 5/2004 | Takeuchi et al. | | 52/167.1 |
| 6,754,992 B1 * | 6/2004 | Byfield et al. | | 52/36.5 |
| 6,829,872 B2 * | 12/2004 | Wahlsteen | | 52/741.1 |
| 6,837,016 B2 * | 1/2005 | Simmons et al. | | 52/655.1 |
| 7,021,020 B2 * | 4/2006 | Simmons et al. | | 52/656.9 |
| 7,127,863 B2 * | 10/2006 | Simmons | | 52/838 |
| 7,172,381 B2 * | 2/2007 | Miyazaki | | 411/372.6 |
| 7,178,296 B2 * | 2/2007 | Houghton | | 52/261 |
| 7,310,920 B2 * | 12/2007 | Hovey, Jr. | | 52/655.1 |
| 2002/0184836 A1 * | 12/2002 | Takeuchi et al. | | 52/167.1 |
| 2003/0041549 A1 * | 3/2003 | Simmons et al. | | 52/655.1 |
| 2003/0177732 A1 * | 9/2003 | Wahlsteen | | 52/655.1 |
| 2004/0074161 A1 * | 4/2004 | Kasai et al. | | 52/167.1 |
| 2004/0139683 A1 * | 7/2004 | Simmons | | 52/719 |
| 2004/0244330 A1 * | 12/2004 | Takeuchi et al. | | 52/729.1 |
| 2005/0055954 A1 * | 3/2005 | Simmons | | 52/633 |
| 2005/0066612 A1 * | 3/2005 | Simmons | | 52/633 |
| 2005/0072108 A1 * | 4/2005 | Simmons et al. | | 52/720.1 |
| 2005/0193680 A1 * | 9/2005 | Wang | | 52/656.9 |
| 2006/0150562 A1 * | 7/2006 | Simmons et al. | | 52/655.1 |
| 2007/0209314 A1 * | 9/2007 | Vaughn | | 52/720.1 |
| 2007/0261356 A1 * | 11/2007 | Vaughn | | 52/655.1 |

* cited by examiner

MOMENT RESISTANT BUILDING COLUMN INSERT SYSTEM AND METHOD

CROSS-REFERENCE TO RELATED APPLICATIONS

This application is a continuation-in-part application of U.S. patent application Ser. No. 11/373,719 filed Mar. 10, 2006 now U.S. Pat. No. 7,637,076. This application is cross-referenced to and claims the benefit from U.S. patent application Ser. No. 11/373,719 filed Mar. 10, 2006, which is hereby incorporated by reference.

FIELD OF THE INVENTION

The invention relates generally to building structures. More particularly, the invention relates to a building column insert that provides a moment-resistant alignment and connection between columns and beams, and column splices.

BACKGROUND

It is currently desirable to use moment-resistant structures in construction of new buildings because they offer fewer restrictions for design and more useful space, while adhering to building design codes. The moment-resistant structures must meet building code standards that require the moment-resistant connections to deflect and absorb energy resulting from earthquakes or high winds. A rigid joint is typically used to resist lateral forces by holding columns and beams fixed in relation to one another. As a result, the joints can become highly stressed during a seismic event. In a moment-resisting structure, the vertical and lateral loads are resisted by the bending strength of the beams and columns. Modern building codes require the strength of the columns and beams be proportioned to prevent column failure by allowing permanent deformation in the beam prior to any column failure. The greatest demand on the columns and beams occurs at and adjacent to the joints between columns and beams.

Moment-resistant frames are most often made of structural steel with bolted or welded joints. Bolted moment frames require plates welded to the ends of beams, that are in turn bolted to the column. Successful moment-resisting frames provide a ductile structure that will distort prior to failure and if properly detailed will not fail in a brittle manner. These frames develop their resistance to lateral forces through the flexural strength and continuity of the beam and column.

An acceptable moment-resisting beam column joint must remain rigid to the point of beam failure. Often, the Reduced Beam Section (RBS) is used to provide a "fuse" in the beam where failure occurs while the joint between the column and beam remains rigid. To accomplish this the joint must resist compression and tension forces produced by the bending in the beam at the beam flanges.

In the past most columns and beams have been "I" shaped members called wide flange sections. The top and bottom of the "I" section is the flange. Typically the beams frame into the column flange, which is the "strong axis" direction of the section. The beam flanges are usually welded to the flange(s) of the column. This configuration gives the column-beam joint great strength in one direction. To provide the same strength in the other direction, at 90 degrees from the first direction, some columns in the structure must be rotated or loads must be resisted in the "weak axis" direction of the column. This would require a stronger column to resist weak axis loads and use of configurations for weak axis column joints. Most small buildings require columns that must resist loads in each direction. This is a problem for "I" section columns in that much larger columns would be required to resist weak axis loads.

In contrast, Hollow Square Sections (HSS) have the same properties in each direction. Using hollow square tube sections for columns can make design and detailing essentially the same in each direction and the same column can be used for moment resisting connections in each direction. However, the HSS column presents a challenge in another way from the typical "I" section column in making the moment-resisting connection between the beam and the column.

A problem arises when assembling the beams to the columns where multiple beams and columns are required. With bolted moment frames using HSS columns, a through-bolt connection could be used to secure the beam end plate to the column. However, when multiple columns and beams are used to span a length of building, the use of through-bolts would necessitate aligning and securing multiple beams simultaneously to the columns. In the case of a linear span, the assembly process requires the holes of a first beam end plate to be aligned with the through-holes in a column and aligning the holes of a second, opposing beam plate with the column through-holes, then inserting the through bolts in each hole for tightening with nuts and washers. It would be necessary to install all the beams at each line and level simultaneously. This process could be slow, difficult, expensive or very impractical.

In the ongoing effort to improve building frame construction that better handles severe lateral loads, such as earthquake and high-wind loads, much attention has been focused on the manner in which upright columns and horizontal beams are connected. Attempts to addresses this issue include a column-beam interconnect with the ends of beams joined to columns using nodes of intersection and collar structures that surround the sides of the column as taught by Simmons et al. (U.S. Pat. No. 6,837,016). Other attempts include Okawa et al., (U.S. Pat. No. 5,410,847) who teaches a rod-like orthogonal metal connector provided in concrete structure members with junction hardware to connect a steel member to the structure member. Chen, (U.S. Pat. No. 5,595,040) teaches a beam-to-column connection for connecting an H-beam to a column surface, where the connection is defined at an end of the H-beam having a web plate and a pair of flange plates. Houghton (U.S. Pat. No. 6,138,427) teaches a moment resisting, beam-to-column connection, using two gusset plates attached to a column and extending along the sides of a beam and having connecting elements, where the connecting elements are bolted, riveted or welded to the beam along its longitudinal direction and to the gusset plates. Katayama et al. (U.S. Pat. No. 6,532,713) teaches a composite beam connected to a column by inserting a mortise pin into a bottom hole of a column and then inserting a locking pin into a through-hole of the mortise pin and the horizontal hole of the column such that joint of the composite beam and the column is firmly secured. Further, Briggs (U.S. Pat. No. 3,593,477) teaches a concrete beam reinforcement anchor embedded in the concrete, which has a plane surface in the side-face of the beam or column for bolting a beam thereto. Additionally, Sato et al. (U.S. Pat. No. 5,012,622) teach a solid concrete core thrust into a column, which then disallows the use through-bolt assembly and necessitates a clamping assembly that has limited utility.

These and other designs and systems have been used to make this connection but they are considered costly, less flexible or impracticable to build. Accordingly, there is a need to develop a system that allows for the less expensive assembly of the beams to the columns in moment frames. It would be considered an advance in the art using through bolts to connect beams to columns without the need for multiple beams to be installed at the same time, thus simplifying assembly for faster and less expensive construction.

SUMMARY OF THE INVENTION

The current invention provides a moment-resistant building frame system with a column insert that facilitates beam assembly to columns. The system includes a generally tubular shape building column having at least one pattern of through-holes that are transverse to the length of the tube. An insert, of generally tubular shape, rectangular-planar shape or curved-plate shape, having a hardened structural filler disposed inside the insert, where at least one pattern of the through-holes are transverse to a length of the insert and through the structural filler. Before the filler is hardened, at least one threaded element is incorporated to an inner wall of the insert and disposed concentric to at least one of the insert through-holes, creating an alignment through-hole. Additionally threaded element cover is disposed over the threaded element. An insert positioning element is disposed in the hardened filler that is axially along the insert to enable the hole patterns to be aligned, where the insert can then be held from the positioning element and secured to the column using screws or welding, for example. In the system of the current invention, the positioning element enables alignment of the insert through-hole pattern with the column through-hole pattern, where the insert is sized to fit within the column. The system further includes at least one beam, where the beam has a mounting plate attached to a beam end. The mounting plate has mounting plate through-holes arranged in the column through-hole pattern, where the mounting plate abuts an outside wall of the column with the hole patterns aligned. At least one erection connector, for example an erection bolt, spans through the mounting plate, through a wall of the column, through a wall of the insert and into the threaded element for tightening. The system further includes at least one set of mounting plate connector hardware, where the mounting plate connector hardware secures the beam mounting plate to the column. The mounting plate connector hardware includes a mounting plate through-bolt, a mounting plate nut, and at least one mounting plate washer. The mounting plate through-bolts are inserted through at least the mounting plate holes, the column holes, the insert through-holes, the filler through-holes, and into the mounting plate nuts and tightened, where the mounting plate washers are on the column outer wall.

In one aspect of the invention, the building column has a cross-section that can be circular, rectangular, square or polygonal. In another aspect the column insert can have a cross-section such as circular, rectangular, square, linear or polygonal.

In a further aspect of the invention, the threaded element is a threaded through-hole in the insert.

In another aspect, the column insert is a threaded nut. In yet another aspect, the column insert is a plate having at least one through-hole and a threaded nut attached to the plate that is concentrically aligned to the through-hole.

In one aspect of this embodiment, the structural filler can be concrete, grout, plastic, epoxy or compression resistive material.

In a further aspect this embodiment of the invention, the insert positioning element is a hole for receiving a hoist end there through.

In one aspect of this embodiment, the system further has a plate attached to a top of the building column to provide sheer-strength when the beam is attached near the building column top.

In one embodiment of the invention, the building column insert system has a first column of generally tubular shape having a first column top end and a first column bottom end, a second column of generally tubular shape having a second column top end and a second column bottom end column, where the second column bottom end has through-holes arranged in a pattern that are transverse to a length of the tube. The system further has a column insert, wherein the insert is sized to fit within the building columns, and the insert has a top half with through-holes arranged in the pattern and a bottom half is inserted to the first column top end and welded thereto. The system of the current embodiment further has insert connectors that include a threaded element incorporated to an inside wall of the insert and concentric to the column insert through-hole, and a connection bolt. The insert top end is inserted to the second column bottom end and the second column hole pattern is aligned with the insert hole pattern, where the connection bolts are inserted through the building column through-holes, through the column insert though holes and into the threaded elements and tightened thereto.

In one aspect of this embodiment the threaded element is a threaded through-hole in the insert. In another aspect, the threaded element is a nut attached to the insert. In yet another aspect, the threaded element is a nut cage attached to the insert.

In one aspect of the invention, the building column can have a cross-section such as circular, rectangular, square or polygonal. In a further aspect, the insert can have a cross-section such as circular, rectangular, square, linear or polygonal.

In another embodiment of the invention, the building column insert includes an insert column of generally tubular shape. A hardened structural filler is disposed within the insert, a pattern of through-holes are transverse to a length of the insert column and through the structural filler, where an insert positioning element is disposed axially along the column. Before the filler is added, at least one beam erection through-hole having at least one threaded element incorporated to an inner wall of the insert and disposed concentric to the erection through-hole is provided, where a threaded element cover disposed over the threaded element. In this embodiment, the erection element enables alignment of the insert through-hole pattern with a building column through-hole pattern and the beam plate through-hole pattern, where the insert is sized to fit within the building column.

In one aspect of the current embodiment, the insert can be a column having a cross-section such as circular, rectangular, square and polygonal.

In a another aspect, the threaded element is a threaded through-hole in the insert. In a further aspect, the threaded element is a nut attached to the insert.

In another aspect of this embodiment, the insert positioning element is a hole for receiving a hoist end there through.

In another aspect of this embodiment, the structural filler may be concrete, grout, plastic, epoxy or compression resistive material.

Another embodiment of the invention includes a method of using the moment resistant building column insert system. The method includes providing a building column, where the building column is generally tubular shape having at least one pattern of through-holes transverse to a length of the tube, providing an insert of generally tubular shape, rectangular-planar shape or curved-plate shape, where the insert column has hardened structural filler disposed within the insert, at least one pattern of the through-holes transverse to a length of the insert tube and through the structural filler, at least one threaded element incorporated to an inner wall of the insert and disposed concentric to one of the insert through-holes, a threaded element cover disposed over the threaded element, and an insert positioning element disposed axially along the insert. In this embodiment, the positioning element enables alignment of the insert through-hole pattern with the column through-hole pattern, where the insert is sized to fit within the column. The current embodiment further includes providing at least one beam having a mounting plate attached to a beam end, where the mounting plate includes a pattern of through-holes arranged in the pattern, and mounting plate abuts an outside wall of said column. The current embodiment further includes providing at least one erection insert connector, such as an erection bolt, where, when the patterns of holes are aligned, the erection bolt spans through the mounting plate, through a wall of the column, through a wall of the insert and into the threaded element, where the beam is positioned on the building column for the final connection to the column. This embodiment further includes providing at least one set of mounting plate connector hardware, where the mounting plate connector hardware includes a mounting plate through-bolt, a mounting plate nut, and a mounting plate washer, where the pattern of mounting plate through-holes are aligned with the pattern of column through-holes and the erection connector is secured to the threaded element and the mounting plate through-bolts are inserted through at least the mounting plate holes, the column holes, the insert through-holes, the filler through-holes, and into the mounting plate nuts, whereby the mounting plate connector hardware is tightened.

Another embodiment of the invention includes a method of using the moment resistant building column insert system by providing a first column of generally tubular shape having a first column top end and a first column bottom end, providing a second column of generally tubular shape having a second column top end and a second column bottom end column, where the second column bottom end has through-holes arranged in a pattern that are transverse to a length of the tube. The current embodiment further includes providing a column insert, where the insert is sized to fit within the building columns, whereby the insert has a top half having through-holes arranged in the pattern and a bottom half inserted to the first column top end and welded thereto. Additionally, this embodiment includes providing insert connectors, where the insert connector has a threaded element incorporated to an inside wall of the insert and concentric to the column insert through-hole, and a connection bolt, where the insert top end is inserted to the second column bottom end and the second column hole pattern is aligned with the insert hole pattern. The connection bolts are inserted through the building column through-holes, through the column insert though holes and into the threaded elements and tightened thereto.

Some key advantages of the invention are in simplifying the assembly of multiple beams to a building column with the use of the insert and the erection connector, thus saving time and costs. Another advantage is the added strength to the building column by the insert column or insert plate, where the insert distributes the beam loads along the length of the building column. The building column insert is provided as an insert that has insert connectors and connector covers encased in hardened filler, where the filler has through holes aligned with the insert through holes. The insert with hardened filler eliminates the need for pouring and curing grout for the entire column prior to pre-tensioning the mounting bolts. The insert can be lowered into a building column via a positioning element, and the insert hole pattern is aligned with the building column hole pattern, where the insert can be held by a hoist for assembly or the insert can be secured to the column using screws applied from outside of the column or it can be welded, for example. A further advantage of the invention, is the system enables simple and robust splicing of building columns in a cost effective manner.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The present invention makes possible the erection of beams to columns, and the installation and pretension of the connection bolts possible in a single stop to each beam-column joint in the field. The current invention shortens the process of installing the connection bolts and, prior to pretensioning the connection bolts, filling the entire column with grout or concrete and waiting for the filler to harden to sufficient strength to resist the pretensioning of the connection bolts, then pretensioning the bolts. This would require multiple trips to each beam. The current invention saves time, and reduces labor and material costs. In the invention, erection bolts are temporary bolts that hold the beam in place against the column with the holes in the beam end-plate (mounting plate) aligned with the through-holes in the column and insert. The erection bolts enable the erection of beams to the columns without the necessity of installing the connection through-bolts at time of erection. Once the hole patterns of the mounting plate, column and insert are aligned, connection through-bolts are installed to provide the connection strength needed to make a rigid beam-column moment joint. These bolts must be pretensioned after installation to achieve the strength needed to hold the moment joint rigid. Without the pre-hardened structural filler in the insert, according to the current invention, the column would deform or crush due to the pretensioning.

Figure 1:
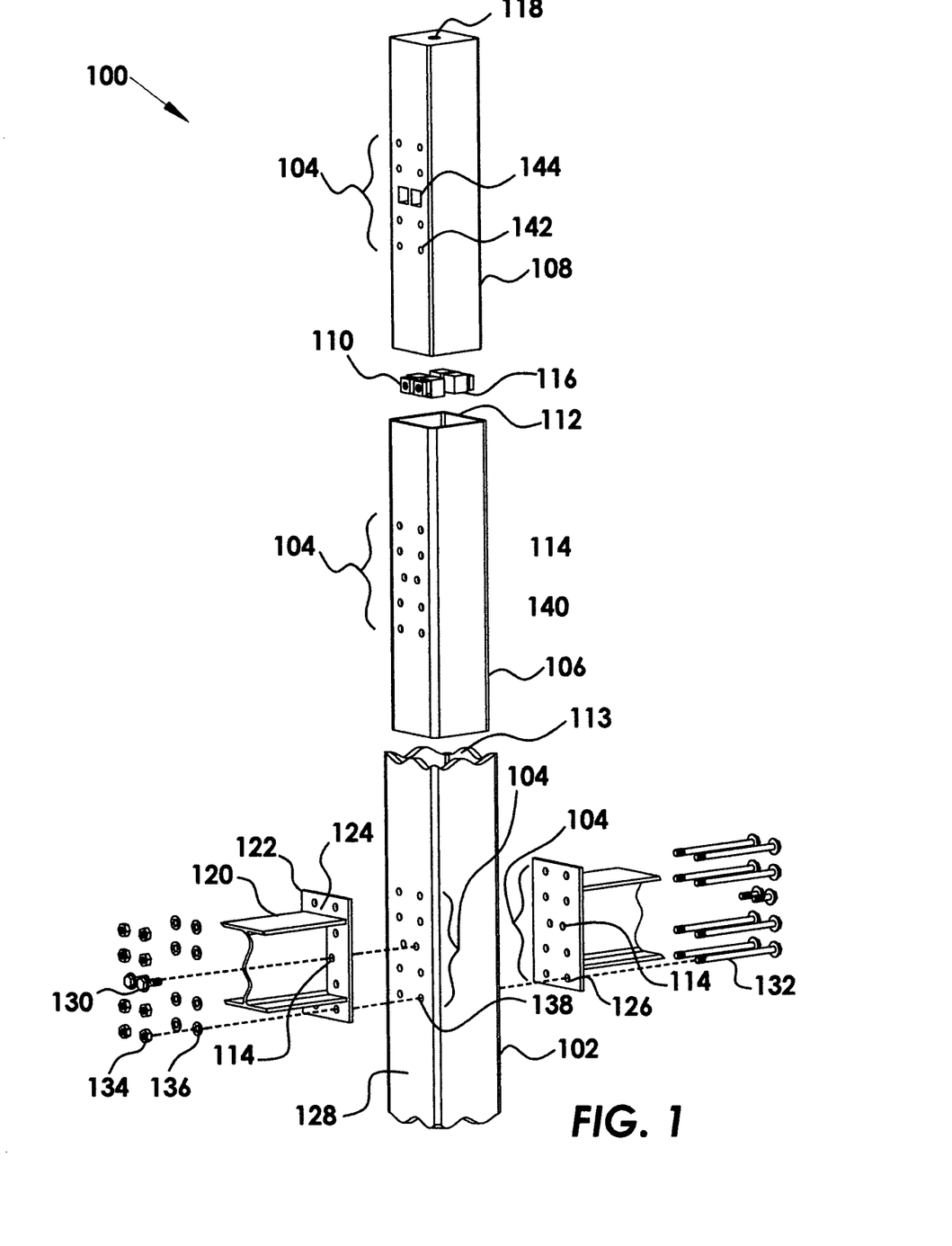
FIG. 1 shows an exploded perspective view of a moment resistant building column insert system according to the present invention.

Referring now to the figures, the current invention provides a moment resistant building column insert system 100, where FIG. 1 shows an exploded perspective view of one embodiment of the invention. The moment resistant building column insert system 100 includes a building column 102, where in this figure the building column 102 is generally tubular shape having at least one pattern 104 of through-holes transverse to a length of the tube. Additionally, the invention has an insert 106 shown here as a column insert of generally tubular shape, where the insert 106 may also be a plate having the through-hole pattern 104, as will be apparent by the description below. A hardened structural filler 108 is disposed within the insert 106 and the column 102. The insert 106 has least one pattern 104 of the through-holes transverse to a length of the insert 106 and there is at least one through-hole pattern 104 through the structural filler 108. Shown in the exploded view of FIG. 1 is at least one threaded element 110 incorporated to an inner wall 112 of the insert 106 and disposed concentric to at least one of the insert through-holes, or referred to here as an erection through-hole 114. Further, a threaded element cover 116 is disposed over the threaded element 110, for preventing the filler 108 entering the hole of the threaded element 110 when the filler 108 is in a non-hardened state. An insert positioning element 118 is disposed axially along the insert 106. The insert positioning element 118 is a hole for receiving a hoist end there through. According to the current embodiment, the positioning element 118 is embodied in the hardened structural filler 108 that is affixed inside the insert 106. The positioning element 118 enables alignment of the through-hole pattern 104 of the insert 106 with the through-hole pattern 104 of the column 102, where the insert 106 is sized to fit within the column 102. The building column insert system 100 further has at least one beam 120, where the beam 120 includes a mounting plate 122 attached to a beam end 124. The mounting plate 122 includes mounting plate through-holes 126 arranged in the pattern 104, where the mounting plate 122 abuts an outside wall 128 of the column 102. Further included is at least one erection connector 130, where in the figure the erection connector 130 is shown as an erection bolt 130. Here the erection bolt 130 spans through the mounting plate 122, through a wall of the column 102, through a wall of the insert 106 and into the threaded element 110 for tightening, where the beam 120 is then desirably positioned on the building column 102. The building column insert system 100 further includes at least one set of mounting plate connector hardware that includes a mounting plate through-bolt 132, a mounting plate nut 134, and a mounting plate washer 136. According to the current invention, with the insert 106 positioned in the column 102, the through-hole pattern 104 on the mounting plate 122 is aligned with the through-hole pattern 104 on the column 102 and the through-hole pattern on the filler 108, and the erection connector 130 is secured to the threaded element 110 for holding the beam 120 in place while the mounting plate connector hardware (132, 134, 136) are assembled, where the mounting plate through-bolts 132 are inserted through the mounting plate holes 126, the column holes 138, the insert through-holes 140, the filler through-holes 142, through the mounting plate washers 136 and into said mounting plate nuts 134, whereby the mounting plate hardware is tightened. Shown in FIG. 1 is a pair of opposing beams 120 and mounting plates 122 positioned on each side of the column 102, where it is understood that one or more beams 120 could be assembled to the column 102. Further shown in FIG. 1 are cavities 144 in the hardened structural filler 108, where the cavities 144 are created when the structural filler 108 is added to the insert 106 in a non-hardened state to fully surround the lengths of the temporary mounting through-bolts (not shown) and the threaded element covers 116, then solidifies. Once hardened, the temporary mounting through-bolts (not shown) are removed to reveal a pattern of through-holes 104 in the insert 106 and hardened filler 108.

The building column 102 can have any cross-section such as circular, rectangular, square or polygonal, for example. Additionally, the column insert 106 can have any cross-section such as circular, rectangular, square, linear or polygonal, for example, where a linear cross-section is for a plate insert 106.

Figure 3:
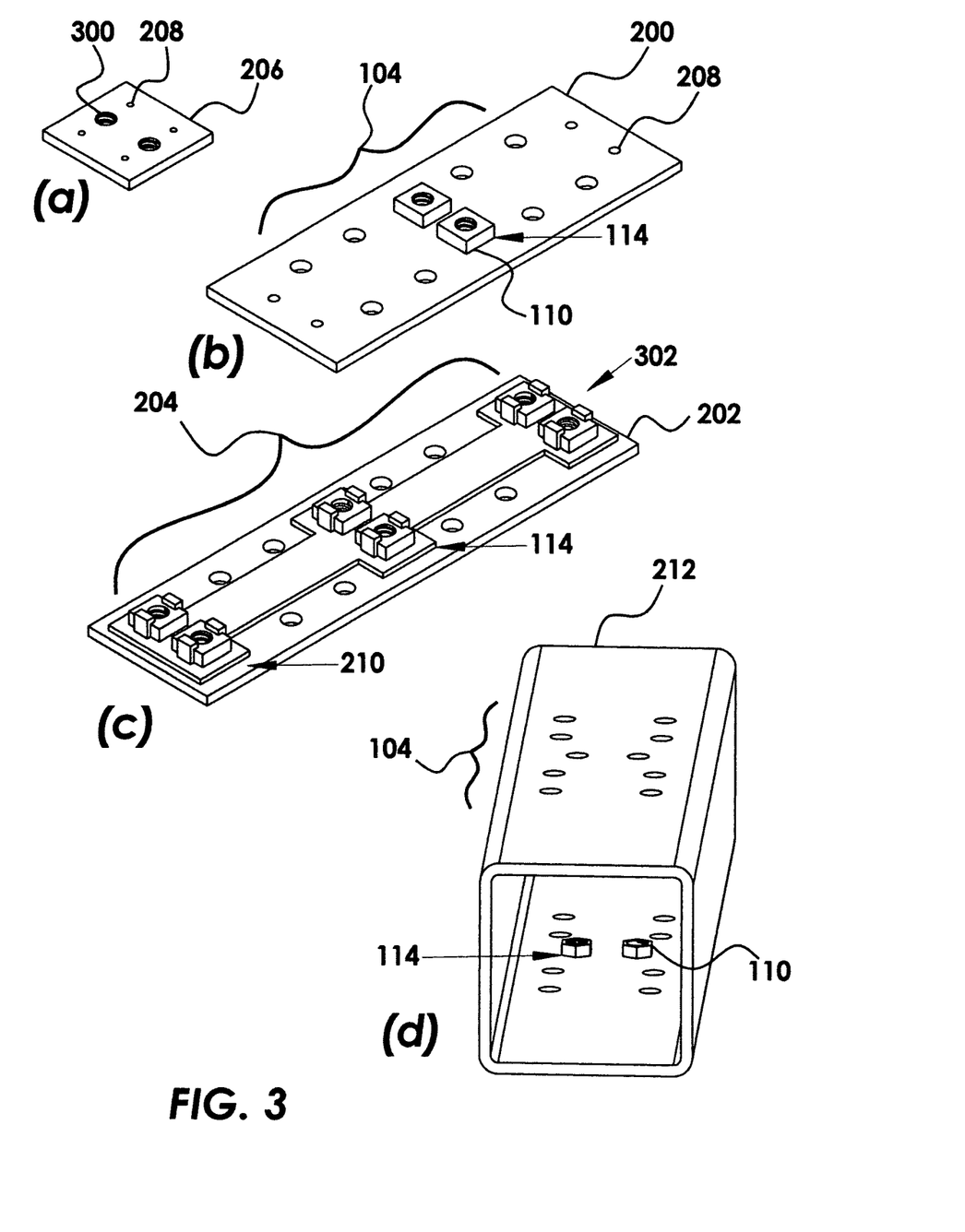
FIGS. 3(a)-3(d) show some variations of the threaded element 110 with the insert according to the present invention.

In FIG. 1, the threaded element 110 is shown as a square bolt, however according to one embodiment, the threaded element 110 can be an erection through-hole 114 that is threaded (see FIG. 3(*a*)), where the threaded element cover 116 would protect the threads from becoming covered with the filler 108 before it solidifies. The structural filler 108 can be concrete, grout, plastic, epoxy or a compression resistive material.

Figure 2:
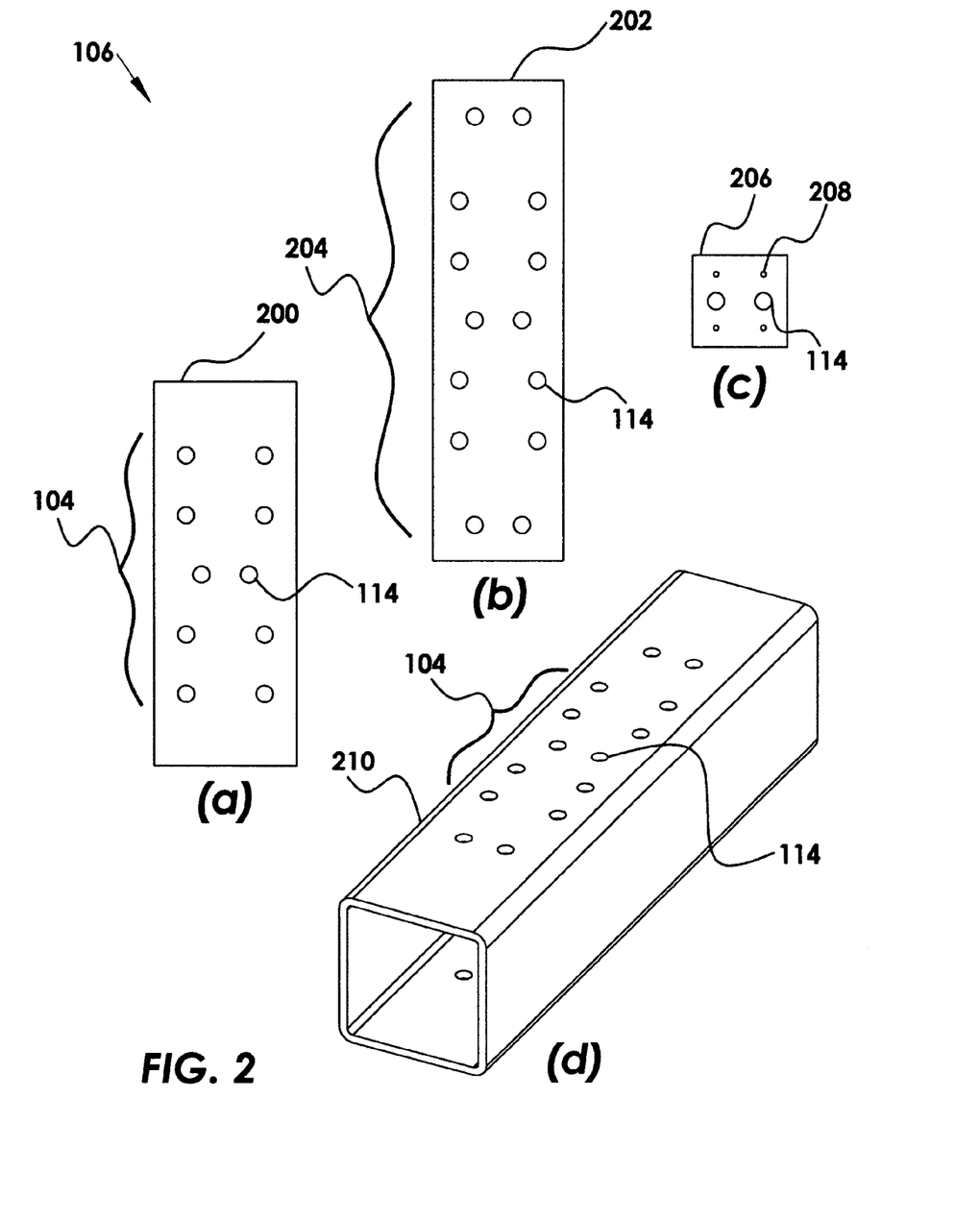
FIGS. 2(a)-2(d) show some embodiments of the erection insert according to the present invention.

FIGS. 2(*a*)-2(*d*) show some embodiments of the erection insert 106. As shown in FIG. 2(*a*), the erection insert 106 can be a plate insert 200 having the hole pattern 104, where the plate insert 200 abuts the column inner wall 113, and where the hole pattern 104 of the plate insert 200 is aligned with the hole pattern 104 of the column. The plate insert 200 is then fixedly attached to the inner wall of the column 102, where the attachment may be done using screws, welding or its equivalents, for example. The alignment through-holes 114 on the plate insert 200 can have a threaded element 110 fixedly attached to the side of the plate insert 200 that is opposite the side abutting the inner wall of the column 102, or the threaded element may be positioned concentric with the plate insert 200 using a nut cage (see FIG. 3(*c*)).

FIG. 2(*b*) shows an extended plate insert 202 that has an extended hole pattern 204, where the extended hole pattern 204 has additional through holes for attaching the extended plate insert 202 to the column 102 and providing additional strength at the connection between the mounting plate 122 and the column 102.

Figure 4:
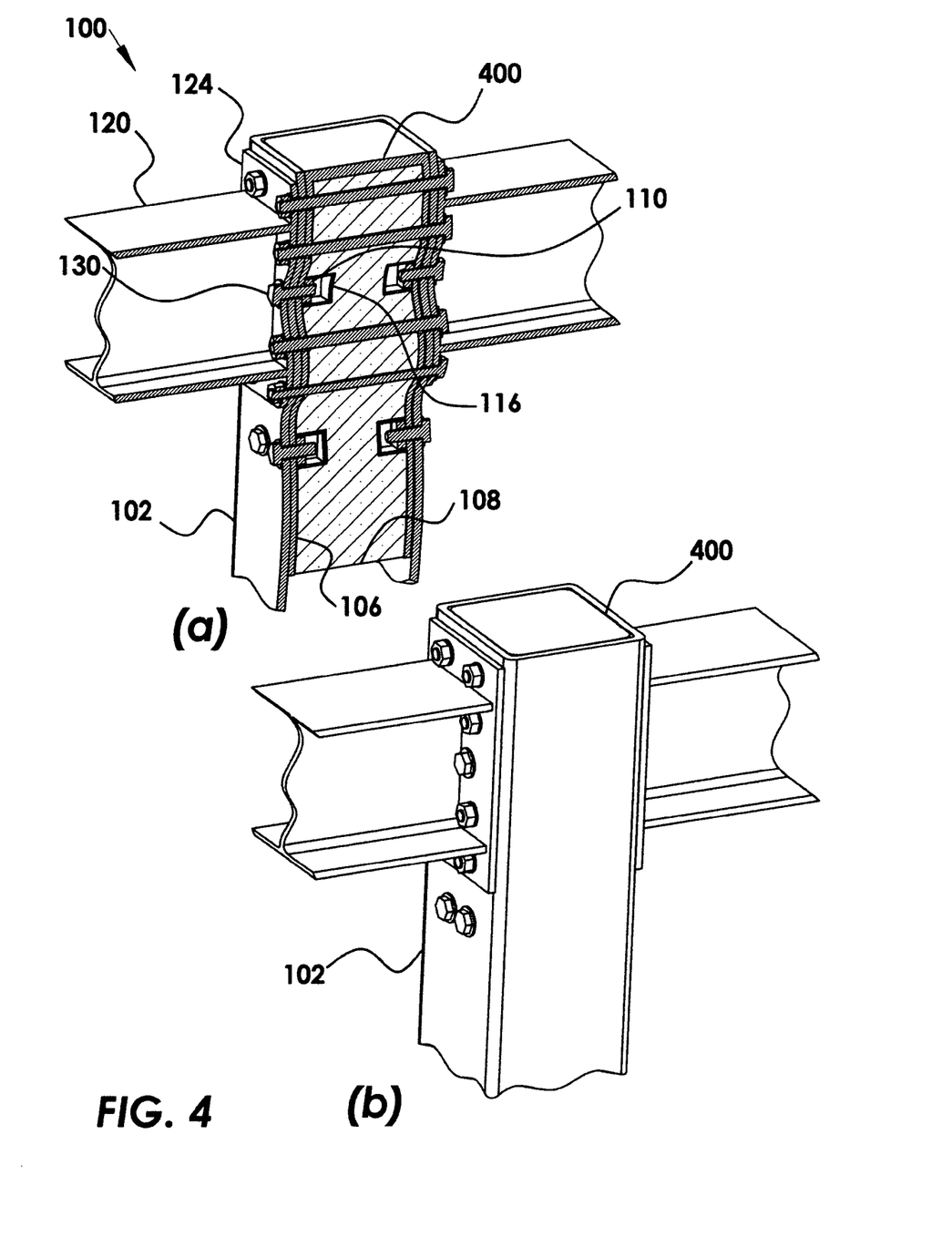
FIGS. 4(a), 4(b) show perspective views of the moment resistant building column insert system according to the present invention.

FIG. 2(*c*) shows an erection insert plate 206 having the alignment through-holes 114, in addition to plate attachment holes 208, where the plate attachment holes 208 can be attachment screw holes to attach the erection insert plate 206 to the inner wall of the column 102. In this embodiment, the erection insert plate 206 has a pair of alignment through-holes 114 that are positioned concentric with the alignment through-holes 114 of the column 102, where the attachment screws are inserted through plate attachment through-holes in the column (see FIG. 4) and into the plate attachment holes 208 of the erection insert plate 206 and tightened to secure the erection insert plate 206 to the inner wall of the column 102. This embodiment of the invention enables simplified alignment of the through-hole pattern 104 of the mounting plate 122 with the through-hole pattern 104 of the column 102. Referring to FIG. 1 and FIG. 2(*c*), The erection connector 130 is inserted through the alignment through-holes 114 of the mounting plate 122, through the alignment through-holes 114 of the column 102, through the alignment through-holes 114 of the erection insert plate 206 and into a threaded element 110 that is attached to the erection insert plate 206. In one embodiment of the invention, the erection insert plate 206 can be a threaded nut 110 aligned with the alignment through-holes 114 of the column 102 and attached thereto.

FIG. 2(d) shows an insert 106 as an column insert 210 of generally tubular shape having the through-hole pattern 104 and the alignment through-holes 114.

FIGS. 3(a)-3(d) show some variations of the threaded element 110 with the insert, where FIG. 3(a) shows the threaded element 110 as a threaded through-hole 300. According to this embodiment, the erection insert plate 206 is attached to the column inner wall 113 using attachment screws (see FIG. 4(a)) screwed into the column 102 and into the plate attachment holes 208 of the erection insert plate 206. FIG. 3(b) shows the plate insert 200 having the hole pattern 104, where the threaded element 110 is aligned with the erection through-hole 114 of the plate insert 200 and welded thereto (not shown). The plate attachment holes 208 are shown as an example of how the plate insert 200 may be attached to the column inner wall 113, however the plate insert 200 may be attached using welding or its equivalents (not shown). FIG. 3(c) shows the extended plate insert 202 having a nut cage 302 attached thereto, where the nut cage 302 holds the threaded elements 110 in alignment over additional alignment through holes 210 of the extended hole pattern 204 and over the alignment through-holes 114. FIG. 3(d) shows the insert 106 as a column insert 212 of generally tubular shape. The insert column 212 has the through-hole pattern 104 with the threaded elements 110 fixedly attached to the insert inner wall 112 and concentric to the alignment through-holes 114, where it is understood that the threaded elements 110 may be attached using welding or its equivalents (not shown). It should also be apparent that the securing of any embodiment of the insert 106 to the column 102 to abut the column inner wall 113, with the hole pattern 104 of the insert 106 aligned with the hole pattern 104 of the column 102, can be done using the attachment screws and the attachment holes 208 or by welding or its equivalents (not shown).

Regarding FIGS. 2 and 3, if one of the plates (200, 202, 208) is used instead of the tubular insert 210, then all or part of the column 102 must be grouted prior to pretensioning the connector bolts 132. Here, the advantage in using an insert plate (200, 202, 208) is the ability to use an erection bolt 130 to erect the beam 120 to the column 102, one beam 120 at a time when multiple beams 120 must be connected to the same column. The longer insert plate 202 can also increase column 102 bending capacity where the ends of the plate 202 are connected to the column 102.

FIGS. 4(a) and 4(b) show perspective views of the moment resistant building column insert system 100 according to one embodiment of the invention. FIG. 4(a) shows a perspective cutaway view of the embodiment, where opposing beams 120 are attached near the top of the column 102. The current invention includes a top plate 400 attached to the top of the building column 102, using welding for example, where the top plate 400 provides additional lateral strength at the top of the column 102. Further shown is the erection connector 130 inserted through the mounting plate 122, through a wall of the column 102, through a wall of the insert 106 and into the threaded element 110, where the threaded element 110 has a threaded element cover 116 to shield the threaded element 110 from the structural filler 108 before it is hardened. FIG. 4(b) shows a perspective partial cutaway view showing the moment resistant building column insert system 100 of FIG. 4(a) where the top plate 400 is shown secured to the top of the column 102.

Another embodiment of the moment resistant building column insert system 100 is shown in FIGS. 5(a)-5(c). Shown is a first column 500 of generally tubular shape having a first column top end 502 and a first column bottom end 504. Additionally shown is a second column 506 of generally tubular shape having a second column top end 508 and a second column bottom end 510, where the second column bottom end 510 has a pattern of through-holes 512, shown here with connectors 130 installed therein, that are transverse to the length of the tube 506.

Shown in FIG. 5(b) is a column insert 106, where the insert 106 is sized to fit within the building columns (500, 506). An insert bottom section 514 is fitted into the first column top end 502 and welded 518 thereto, where the insert 106 has a top section 516 with insert through-holes 518 arranged in the pattern of the second column bottom end 510 through-holes 512. The system 100 uses the insert connectors including a threaded element 110 incorporated to the insert inside wall 112 and concentric to the pattern of through-holes 512 in the column insert 106. Here the threaded elements 110 are shown as a nut cage 302 that is welded to the insert inner wall 112, where other threaded elements 110 may be used.

The insert top section 516 is inserted to the second column bottom end 510 and the hole patterns 512 of the second column 506 and the insert 106 are aligned, where the erection connectors 130 are inserted to the through-holes 512 and into the threaded elements 110 and tightened thereto. According to one embodiment, the threaded element 110 is a threaded through-hole 300 in the insert, or the threaded element 110 is a nut attached to the insert 106 as discussed in FIG. 3.

Figure 5:
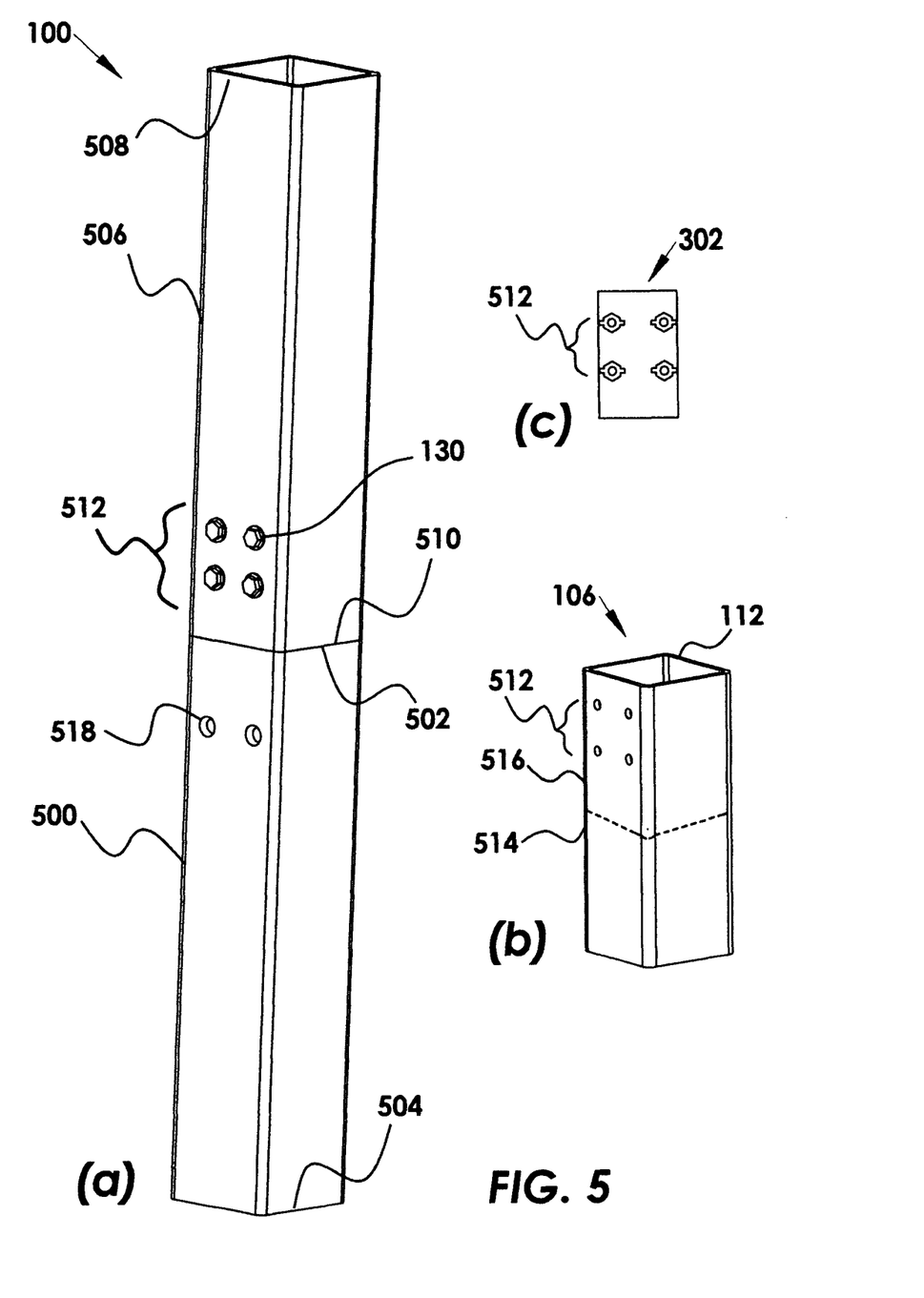
FIGS. 5(a)-5(c) show embodiment of the moment resistant building column insert system according to the present invention.

In another aspect of the embodiment shown in FIG. 5, the building columns (500, 506) can have a cross-section such as circular, rectangular, square of polygonal, and the insert 106 can have a cross-section such as circular, rectangular, square and polygonal.

Figure 6:
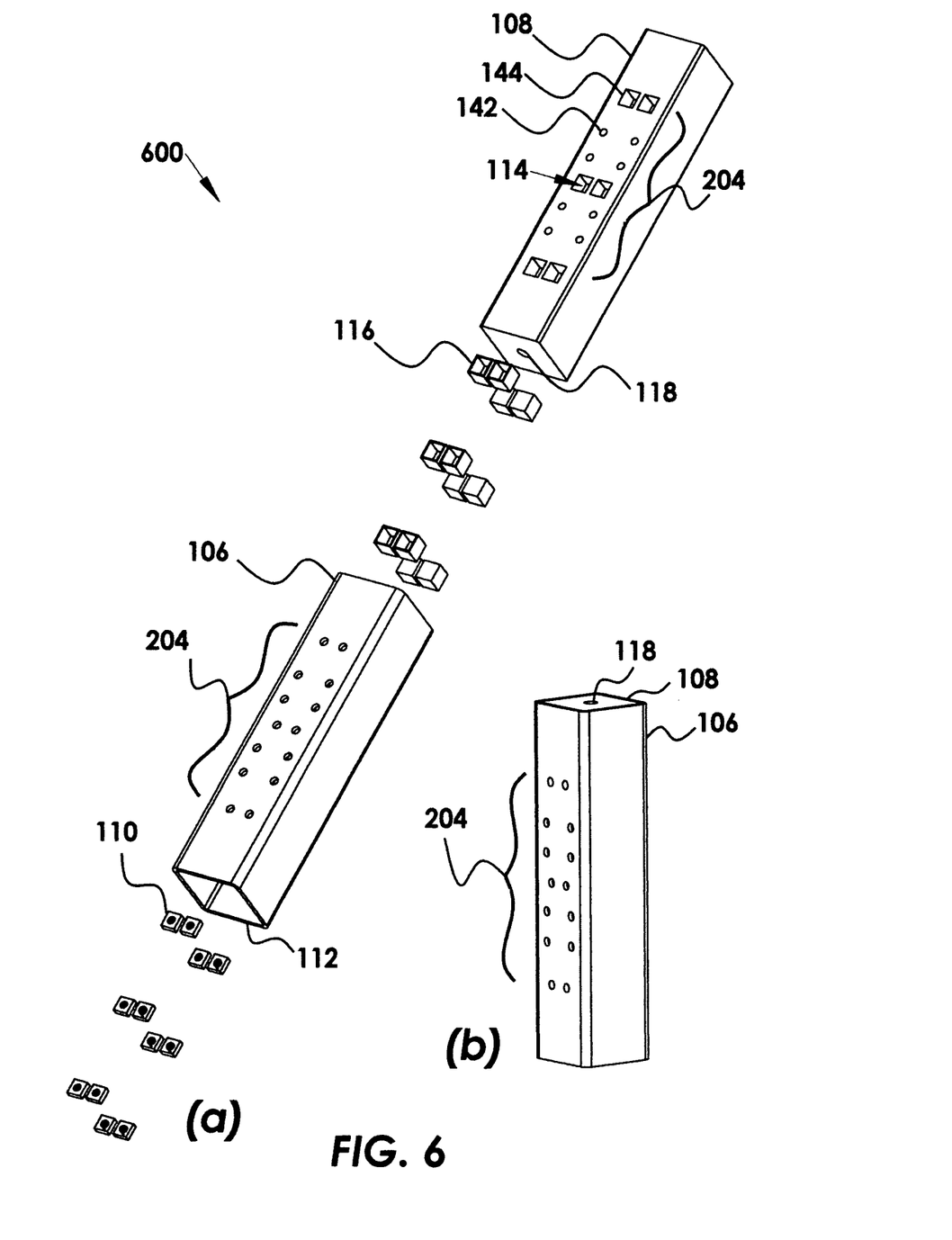
FIGS. 6(a), 6(b) show an exploded perspective view and a collapsed perspective view of another embodiment of the moment resistant column insert invention.

FIGS. 6(a) and 6(b) show an exploded perspective view and a collapsed perspective view of another embodiment of the moment resistant column insert invention. Shown is a modular moment resistant building column insert 600 that has an insert column 106 of generally tubular shape. The insert 106 holds a hardened structural filler 108 disposed within the insert 106 having a pattern of through-holes 204 transverse to a length of the insert column 106 and through the structural filler 108, where the through-hole pattern 204 shown is for the extended plate of FIG. 3(c) and it should be understood that other hole patterns may be used. The filler 108 has at least one cavity 144 positioned where over the beam erection through-hole 114, not seen in the drawings but an arrow is provide in FIG. 6(a) to indicate one possible location. Further, there is at least one threaded element 110 incorporated to an insert inner wall 112 and disposed concentric to the erection through-hole 114, where a threaded element cover 116 is disposed over the threaded element 110; it is the threaded element covers 116 that create the cavities 114 when the non-hardened filler 108 surrounds the covers 116. An insert positioning element 118 disposed axially along the column 106 is provided, where the positioning element 118 enables alignment of the insert through-hole pattern 104 with a through-hole pattern 104 of a building column 102. The insert 106 is sized to fit within the building column 102. FIG. 6(b) shows the modular moment resistant building column insert 600 that is to be positioned inside a column 112 (not shown).

In one aspect of the current embodiment, the insert column 106 can have a cross-section such as circular, rectangular, square or polygonal.

In other aspects, the threaded element 110 can be a threaded through-hole in the insert 106 or a nut attached to the insert 106.

In another aspect of this embodiment, the insert positioning element 118 is a hole for receiving a hoist end there through (not shown). And, in a further aspect, the structural filler 108 can be concrete, grout, plastic, epoxy or compression resistive material.

Figure 7:
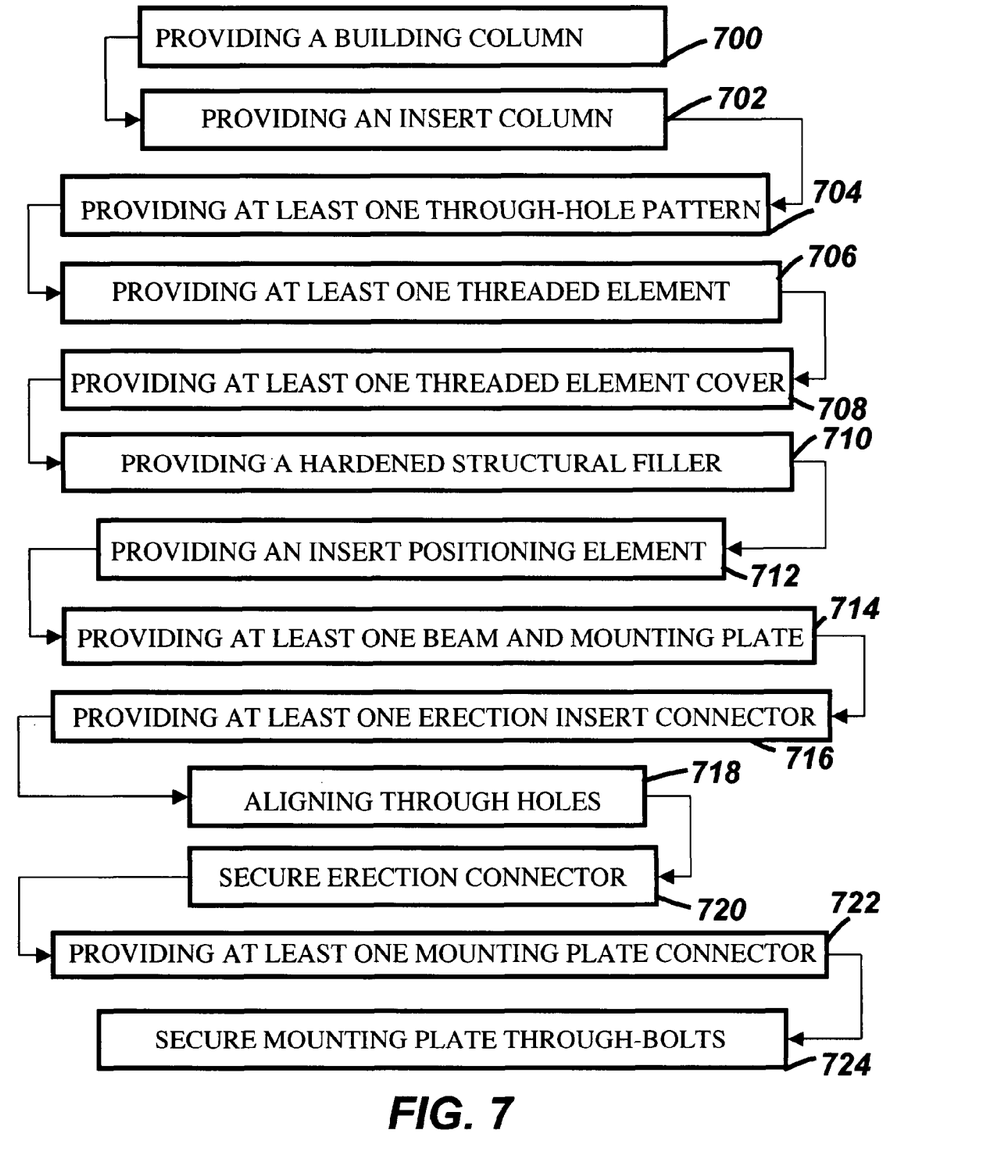
FIG. 7 shows the steps of using the moment resistant building column insert system according to the present invention.

A general method of using the moment resistant building column insert system 100 and a modular moment resistant building column insert 600 is shown by the steps in FIG. 7. The steps include providing a building column 700, wherein the building column is generally tubular shape provide with at least one pattern of through-holes transverse to a length of the tube. And providing an insert 702 such as a plate or a column of generally tubular shape, and providing at least one pattern of through holes 704 transverse to a length of the insert. At least one threaded element is provided 706 that is incorporated to an inner wall of the insert and disposed concentric to one of the insert through-holes, and at least one threaded element cover is provided 708 disposed over the threaded element. Providing a hardened structural filler 710 disposed within the insert, where the provided pattern of through-holes 706 are transverse to a length of the insert tube and through the structural filler. An insert positioning element is provided 712 that is disposed axially along the insert. The positioning element enables alignment of the insert through-hole pattern with the column through-hole pattern, whereby the insert is sized to fit within the column. The method further includes providing at least one beam and mounting plate 714, where the beam has the mounting plate attached to a beam end, and the mounting plate has through-holes arranged in the pattern, where the mounting plate abuts an outside wall of the column. Additionally the method includes providing at least one erection insert connector 716, where the insert connector has an erection bolt, where the erection bolt spans through the mounting plate, through a wall of the column, through a wall of the insert and into the threaded element, whereby the beam is positioned on the building column. The pattern of mounting plate through-holes are aligned with the pattern of column through-holes 118 and the erection connector is secured to the threaded element 720. Further, the steps include providing at least one set of mounting plate connector hardware 722, where the mounting plate connector hardware has a mounting plate through-bolt, a mounting plate nut, a mounting plate washer. Additionally, the mounting plate through-bolts are inserted through at least the mounting plate holes, the column holes, the insert through-holes, the filler through-holes, and into the mounting plate nuts, where the mounting plate connector hardware is then tightened 724.

Figure 8:
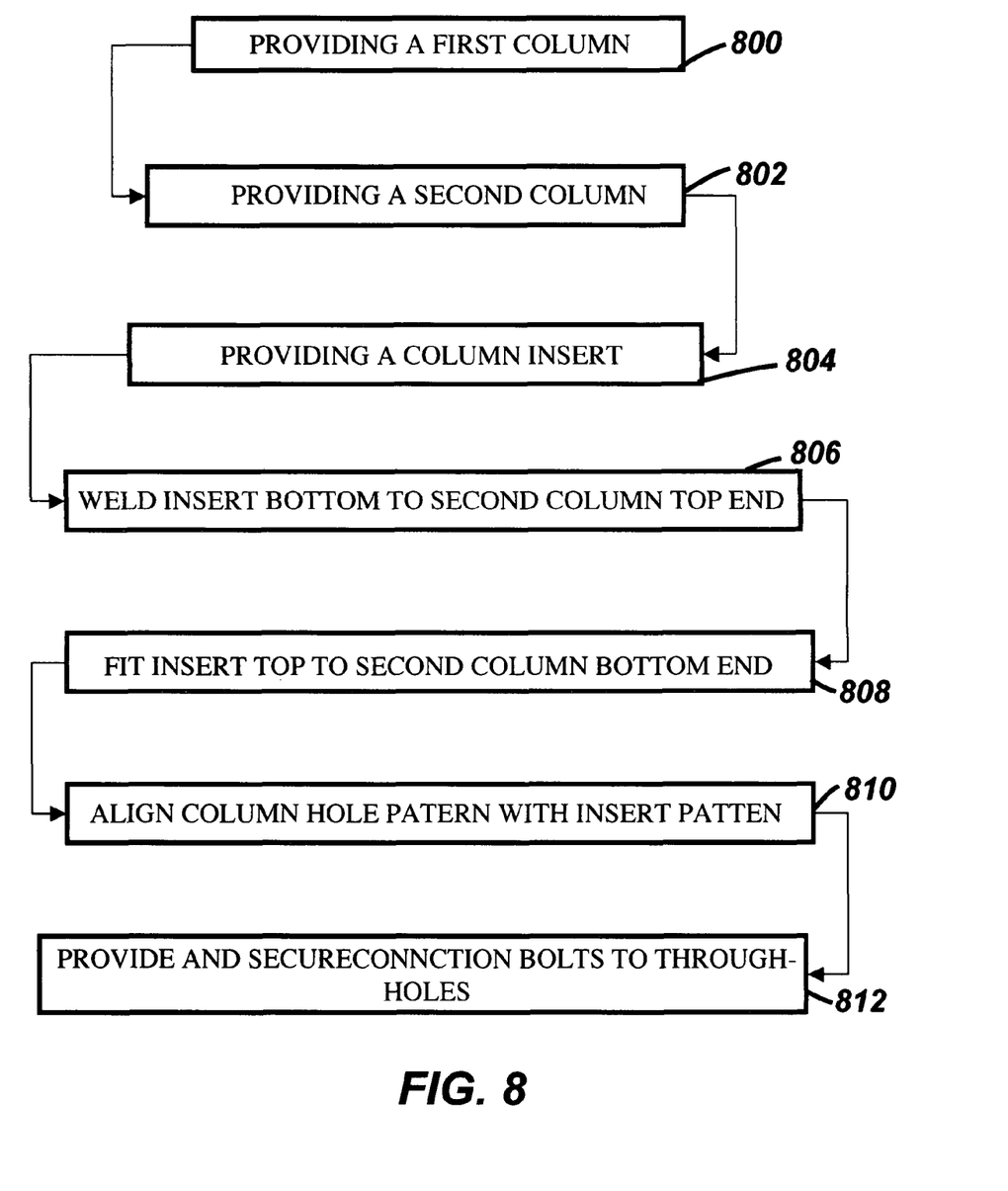
FIG. 8 shows the steps of using the embodiment of FIGS. 5(a)-5(c) according to the present invention.

The method of using the moment resistant building column insert system 100 as shown in FIGS. 5(*a*)-5(*c*) is shown by the steps in FIG. 8. The steps include providing a first column 800 of generally tubular shape having a first column top end and a first column bottom end, providing a second column 802 of generally tubular shape having a second column top end and a second column bottom end column, where the second column bottom end has through-holes arranged in a pattern that are transverse to a length of the tube. The method further includes providing a column insert 804, where the insert is sized to fit within the building columns, and the insert has a top half having through-holes arranged in the pattern and a bottom half inserted to the first column top end 806 and welded thereto. The insert top end is inserted to the second column bottom end 808 and the second column hole pattern is aligned with the insert hole pattern 810. Additionally provided are insert connectors, where the insert connector have a threaded element incorporated to an inside wall of the insert and concentric to the column insert through-hole, and an erection bolt, where the erection bolts are inserted 812 through the building column through-holes, through the column insert though holes and into the threaded elements and tightened thereto.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, in one variation the connection plate can be flush, or nearly flush, with the top and bottom of the beam. Larger bolts, or an increased number of bolts, could be used to connect the beam to the column and produce the rigid moment connection desired. In another variation, where greater stiffness in one direction is needed for structure, rectangular columns can be used with the longer direction of the rectangular column in the stiffer direction needed. Further, the beams can be sloped to match a roof structure slope and still connect to the column as a rigid moment connection. An additional variation may occur when beams are framed into a column at a 90-degree angle, the beam positions can be off-set vertically to allow the through-bolts to pass one another in the column, and still produce a rigid connection in each direction. In a further variation, the erection insert can be used with columns that will be completely grouted to provide greater vertical capacity to aid in the erection of the beams.

All such variations are considered to be within the scope and spirit of the present invention as defined by the following claims and their legal equivalents.

What is claimed:

1. A moment resistant building column insert system, comprising:
   a. a building column, wherein said building column is generally tubular shape having at least one pattern of through-holes transverse to a length of said tube;
   b. an building column insert having column of generally tubular shape comprising:
      i. a pre-hardened structural filler disposed within said insert;
      ii. at least one said pattern of through-holes transverse to a length of said insert and through said structural filler;
      iii. at least one threaded element incorporated to an inner wall of said insert and disposed concentric to at least one of said insert through-holes;
      iv. a threaded element cover disposed over said threaded element; and
      v. an insert positioning element disposed axially along said insert, wherein said positioning element enables alignment of said insert through-hole pattern with said column through-hole pattern, whereby said insert is sized to fit within said column;
   c. at least one beam, wherein said beam comprises a mounting plate attached to a beam end, whereby said mounting plate comprises mounting plate through-holes arranged in said pattern, whereas said mounting plate abuts an outside wall of said column;
   d. at least one erection connector, wherein said erection connector comprises an erection bolt, whereby said erection bolt spans through said mounting plate, through a wall of said column, through a wall of said insert and into said threaded element, whereas said beam is desirably positioned on said building column;
   e. at least one set of mounting plate connector hardware, wherein said mounting plate connector hardware comprises;
      i. a mounting plate through-bolt;

ii. a mounting plate nut; and iii. a mounting plate washer; wherein when said pattern of mounting plate through-holes are aligned with said pattern of column through-holes said erection connector is secured to said threaded element, wherein said mounting plate through-bolts are inserted through said mounting plate holes, said column holes, said insert through-holes, said filler through-holes, and into said mounting plate nuts, wherein said mounting plate connector hardware is pre-tensioned through said pre-hardened structural filler in said insert, wherein deforming or crushing of said column is prevented by said pre-hardened filler during said pre-tensioning.

2. The moment resistant building column insert system of claim 1, wherein said tubular building column has a cross-section selected from the group consisting of circular tubular, rectangular tubular, square tubular and polygonal tubular.

3. The moment resistant building column insert system of claim 1, wherein said tubular column insert has a cross-section selected from the group consisting of circular tubular, rectangular tubular, square tubular, and polygonal tubular.

4. The moment resistant building column insert system of claim 1, wherein said threaded element is a threaded through-hole in said insert.

5. The moment resistant building column insert system of claim 1, wherein said column insert is a threaded nut.

6. The moment resistant building column insert system of claim 1, wherein said column insert in a plate having at least one through-hole and a threaded nut attached to said plate, whereby said threaded nut is concentrically aligned to said through-hole.

7. The moment resistant building column insert system of claim 1, wherein said structural filler is selected from a group consisting of concrete, grout, plastic, epoxy and compression resistive material.

8. The moment resistant building column insert system of claim 1, wherein said insert positioning element is a hole for receiving a hoist end there through.

9. The moment resistant building column insert system of claim 1, wherein said system further comprises a plate attached to a top of said building column when said beam is attached near said building column top.

10. A moment resistant building column insert system, comprising:
 a. a first column of generally tubular shape having a first column top end and a first column bottom end;
 b. a second column of generally tubular shape having a second column top end and a second column bottom end, wherein said second column bottom end has through-holes arranged in a pattern that are transverse to a length of said tube;
 c. a column insert, wherein said insert is sized to fit within said building columns, whereby said insert has a top half having through-holes arranged in said pattern and a bottom half inserted to said first column top end and welded thereto; and
 d. insert connectors, wherein said insert connector comprises;
  i. a threaded element incorporated to an inside wall of said insert and concentric to said column insert through-hole; and
  ii. a connection bolt;
 wherein said insert top end is inserted to said second column bottom end and said second column hole pattern is aligned with said insert hole pattern, wherein said connection bolts are inserted through said building column through-holes, through said column insert though holes and into said threaded elements and pre-tensioned thereto, wherein deforming or crushing of said first column and said second column is prevented by said pre-hardened structural filler during said pre-tensioning.

11. The moment resistant building column insert system of claim 10, wherein said threaded element is a threaded through-hole in said insert.

12. The moment resistant building column insert system of claim 10, wherein said threaded element is a nut attached to said insert.

13. The moment resistant building column insert system of claim 10, wherein said threaded element is a nut cage attached to said insert.

14. The moment resistant building column insert system of claim 10, wherein said tubular building column has a cross-section selected from the group consisting of circular tubular, rectangular tubular, square tubular and polygonal tubular.

15. The moment resistant building column insert system of claim 10, wherein said tubular insert has a cross-section selected from the group consisting of circular tubular, rectangular tubular, square tubular and polygonal tubular.

16. A moment resistant building column insert, comprising:
 a. an insert column of generally tubular shape;
 b. a pre-hardened structural filler disposed within said insert column;
 c. a pattern of through-holes transverse to a length of said insert column and through said pre-hardened structural filler;
 d. at least a pair of erection through holes disposed through a wall of said insert column;
 e. at least a pair of threaded elements incorporated to an inner wall of said insert column and disposed concentric to said pair of erection holes;
 f. a threaded element cover disposed over each said threaded element, wherein said threaded element cover is surrounded by said pre-hardened structural filler, wherein said threaded element cover forms a cavity around said threaded element within said pre-hardened structural filler, wherein said threaded element cover is disposed to protect said threaded elements from contamination by said structural filler; and
 g. an insert positioning element disposed axially along said column, wherein said insert positioning element comprises a positioning through-hole disposed for receiving a hoist end there though.

17. The moment resistant building column insert of claim 16, wherein said insert tubular column has a cross-section selected from a group consisting of circular tubular, rectangular tubular, square tubular and polygonal tubular.

18. The moment resistant building column insert of claim 16, wherein said threaded element is a threaded through-hole in said insert.

19. The moment resistant building column insert of claim 16, wherein said threaded element is a nut attached to said insert.

20. The moment resistant building column insert of claim 16, wherein said insert positioning element is a hole for receiving a hoist end there through.

21. The moment resistant building column insert of claim 16, wherein said structural filler is selected from a group consisting of concrete, grout, plastic, epoxy and compression resistive material.

* * * * *